US012750878B2

(12) United States Patent
Du et al.

(10) Patent No.: US 12,750,878 B2
(45) Date of Patent: Sep. 29, 2026

(54) TECHNIQUES FOR MANAGING SIDELINK COMMUNICATIONS

(71) Applicant: ZTE Corporation, Shenzhen (CN)

(72) Inventors: Weiqiang Du, Shenzhen (CN); Lin Chen, Shenzhen (CN); Wei Luo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 285 days.

(21) Appl. No.: 18/614,004

(22) Filed: Mar. 22, 2024

(65) Prior Publication Data

US 2024/0306186 A1 Sep. 12, 2024

Related U.S. Application Data

(63) Continuation of application No. PCT/CN2021/125165, filed on Oct. 21, 2021.

(51) Int. Cl.

*H04W 72/566* (2023.01)
*H04W 72/0446* (2023.01)
*H04W 72/0453* (2023.01)
*H04W 92/18* (2009.01)

(52) U.S. Cl.

CPC ..... *H04W 72/566* (2023.01); *H04W 72/0446* (2013.01); *H04W 72/0453* (2013.01); *H04W 92/18* (2013.01)

(58) Field of Classification Search

CPC ........... H04W 72/566; H04W 72/0446; H04W 72/0453; H04W 92/18

See application file for complete search history.

(56) References Cited

U.S. PATENT DOCUMENTS

| | | | | |
|---|---|---|---|---|
| 2021/0105126 | A1 | 4/2021 | Yi et al. | |
| 2022/0240265 | A1* | 7/2022 | Sarkis | H04L 5/0037 |

FOREIGN PATENT DOCUMENTS

| | | | |
|---|---|---|---|
| CN | 112385297 | A | 2/2021 |
| CN | 112534921 | A | 3/2021 |
| CN | 118077281 | A | 5/2024 |
| WO | 2020221015 | A1 | 11/2020 |
| WO | 2021207459 | A1 | 10/2021 |
| WO | 2021207473 | A1 | 10/2021 |
| WO | 2023065196 | A1 | 4/2023 |

OTHER PUBLICATIONS

Notice of Allowance from Japanese Patent Application No. JP2024-518152 dated Apr. 10, 2025, 3 pages.

(Continued)

*Primary Examiner* — Samina F Choudhry
(74) *Attorney, Agent, or Firm* — ASHURST PERKINS COIE US LLP

(57) ABSTRACT

Techniques are described to manage sidelink communications. An example wireless communication method includes receiving, by a first communication device, a priority indication that indicates a first priority related to assistance information; and transmitting the assistance information by the first communication device to a second communication device, where the assistance information is transmitted earlier than a transmission of data in response to the first priority related to the assistance information being greater than a second priority of the data.

20 Claims, 6 Drawing Sheets

(56) References Cited

OTHER PUBLICATIONS

International Search Report for International Application No. PCT/CN2021/125165, Mail Date: Jun. 1, 2022. 10 pages.
Extended European Search Report from European Patent Application No. 21960947.6 dated Feb. 7, 2025 (8 pages).
ASUSTeK, "Discussion on V2X mode 2 enhancements," 3GPP TSG RAN WG1 #106bis-e e-Meeting, Oct. 11-19, 2021, R1-2110132. (6 pages).
Hyundai Motors, "Discussion on inter-UE coordination for Mode 2 enhancements," 3GPP TSG RAN WG1 #106bis-e e-Meeting, Oct. 11-19, 2021, R1-2109450. (5 pages).
Intel Corporation, "Design of Inter-UE Coordination Solutions for Sidelink Communication," 3GPP TSG RAN WG1 #106-e e-Meeting, Aug. 16-27, 2021, R1-2107610. (24 pages).

* cited by examiner

TECHNIQUES FOR MANAGING SIDELINK COMMUNICATIONS

CROSS-REFERENCE TO RELATED APPLICATION

This application is a continuation and claims priority to International Application No. PCT/CN2021/125165, filed on Oct. 21, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for managing sidelink communications between two wireless devices (e.g., between a network device and a communication or between two communication devices).

An example wireless communication method includes receiving, by a first communication device, a priority indication that indicates a first priority related to assistance information; and transmitting the assistance information by the first communication device to a second communication device, where the assistance information is transmitted earlier than a transmission of data in response to the first priority related to the assistance information being greater than a second priority of the data.

In some embodiments, the first priority is a priority of a signaling that includes the assistance information. In some embodiments, the first communication device receives the priority indication from a network device. In some embodiments, the first communication device receives the priority indication from the second communication device. In some embodiments, the first priority related to the assistance information is the same as a highest data priority in the second communication device when the first communication device receives from the second communication device a request that triggers the first communication device to transmit the assistance information. In some embodiments, the first priority related to the assistance information is the same as a third priority of another signaling received by the first communication device from the second communication device, and the another signaling triggers the first communication device to transmit the assistance information.

In some embodiments, the first communication device receives from the second communication device a list of one or more frequencies and/or a list of one or more time values, and the first communication device transmits the assistance information using a frequency and/or a time value from the list of one or more frequencies and/or the list of one or more time values. In some embodiments, the first communication device includes a first user equipment (UE), and wherein the second communication device includes a second UE.

Another example wireless communication method includes receiving, by a second communication device, a priority indication that indicates a first priority related to assistance configuration; and transmitting the assistance configuration by the second communication device to a first communication device, where the assistance configuration is transmitted earlier than a transmission of data in response to the first priority related to the assistance information being greater than a second priority of the data.

In some embodiments, the first priority is a priority of a signaling that includes the assistance configuration. In some embodiments, the second communication device receives the priority indication from a network device. In some embodiments, the first priority related to the assistance configuration is the same as a highest data priority in the second communication device. In some embodiments, the second communication device receives any one or more: a hybrid automatic repeat request (HARQ) retransmission number that indicates a number of times HARQ retransmission is allowed for retransmitting the signaling or the assistance information; a packet delay budget (PDB) for the signaling or for the assistance information; a packet error ratio (PER) configured for the signaling or for the assistance information; and/or a HARQ enable or disable attribute for the signaling or for the assistance information. In some embodiments, the first communication device includes a first user equipment (UE), and wherein the second communication device includes a second UE.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
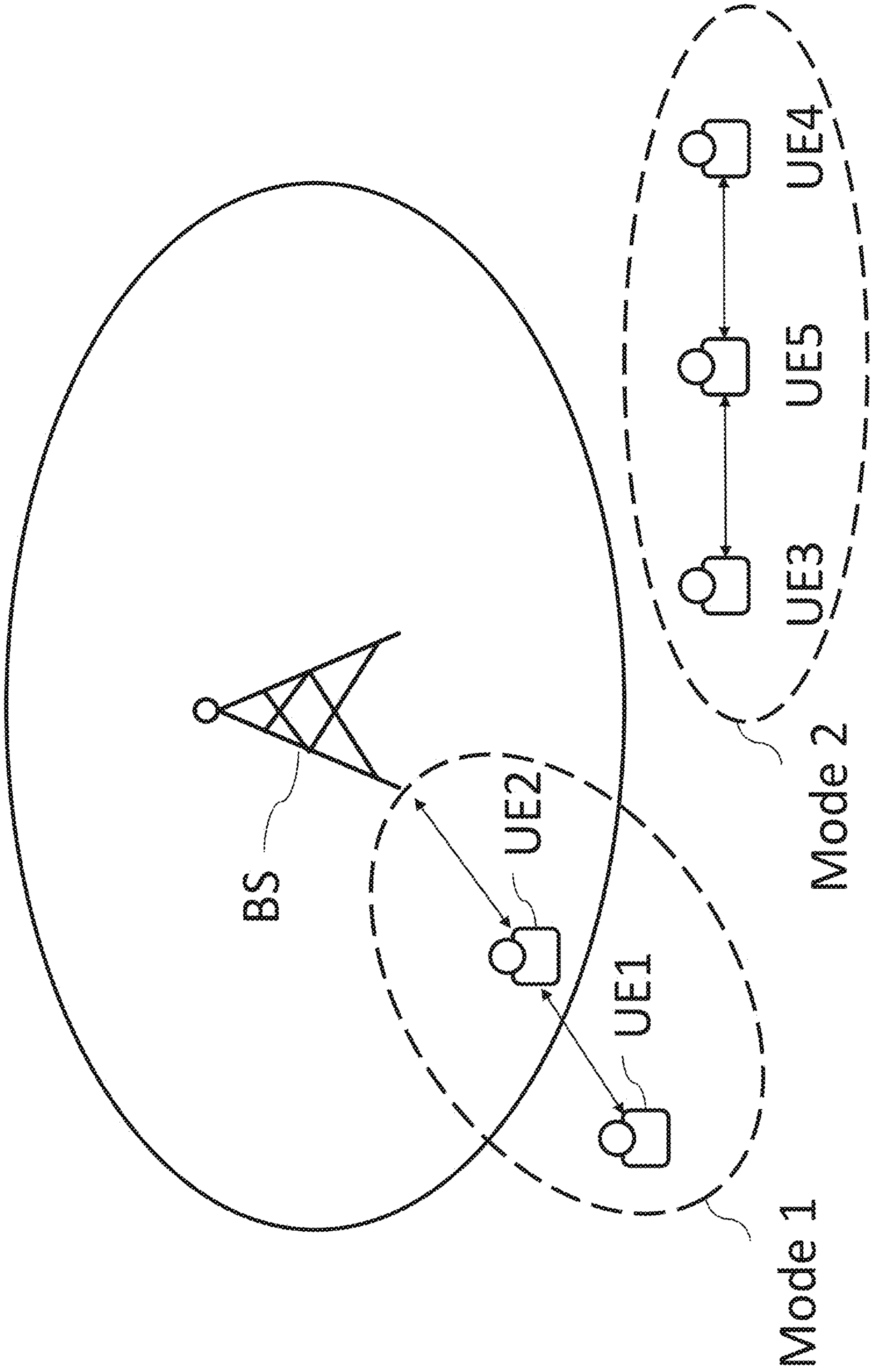
FIG. 1 shows an example UE-to-Network relay scenario and an example UE-to-UE relay scenario.

With the development of wireless multimedia services, people's demands for high data rates and user experience are increasing, which puts forward higher requirements on the system capacity and coverage of traditional cellular networks. On the other hand, application scenarios such as public safety, social networks, close-range data sharing, and local advertising have made people's demand for understanding and communicating with nearby people or things (Proximity Services) gradually increase. The traditional base station-centric cellular network has obvious limitations in terms of high data rate and proximity service support. Under the background of this demand, the device-to-device D2D (Device-to-Device) communication technology has emerged. The application of D2D technology can reduce the burden on cellular networks, reduce battery power consumption of user equipment, increase data rates, and improve the robustness of network infrastructure, which satisfies the above-mentioned high data rate services and proximity services requirements. D2D technology is also known as Proximity Services (Proximity Services, ProSe), unilateral/sidelink/through link (Sidelink (SL)) communication; the interface between the device and the device is the PC5 interface.

From the perspective of the 5G standard, in the current new radio (NR) sidelink communication system, there is no negotiation of the data transmission time between the user equipment (UE) and the device. For the UE that uses NR sidelink mode 2 communication, the UE needs to continuously monitor the data receiving channel to assist the transmission resources. At the same time, the UE sensing mechanism in the existing NR sidelink communication system cannot accurately obtain the communication conditions of the peer UE, and it is prone to hidden and exposed terminals. In order to address at least these technical problems, the UE can consider using the auxiliary resources provided by other UEs select information (e.g., inter-UE coordination).

For inter-UE coordination, there are two types of UE, one is UE-B, another is UE-A. In some embodiments, UE that sends an explicit request for inter-UE coordination information can be UE-B, and a UE that received an explicit request from UE-B and sends inter-UE coordination information to the UE-B can be UE-A. In some other embodiments, the UE-B is a UE that transmits physical sidelink control channel (PSCCH) or physical sidelink shared channel (PSSCH) with sidelink control information (SCI) indicating reserved resource(s) to be used for its transmission, receives inter-UE coordination information from UE-A indicating expected/potential resource conflict(s) for the reserved resource(s), and uses it to determine resource re-selection; and UE-A is the UE that detects expected/potential resource conflict(s) on resource(s) indicated by UE-B's SCI sends inter-UE coordination information to UE-B. Thus, generally, UE-A may provide the assistance information for UE-B's data transmission.

For supporting applications and services with broader ranges, a sidelink based relay communication is proposed to extend the coverage and to improve power consumption of the network. For example, the sidelink based relay communication may be applied to indoor relay communication, smart farming, smart factory and public safety services.

FIG. 1 shows scenarios of applying the sidelink based relay communication which comprise:

1) UE-to-Network relay (Mode 1 shown in FIG. 1): Relay communications of the mode 1 are designed for user equipment (UE) (e.g., UE1 shown in FIG. 1) in an area with weak or no coverage. Under such a condition, the UE1 is allowed to communicate with network (e.g., base station (BS) shown in FIG. 1) via a nearby UE2 covered by the network. As a result, the coverage of the network is extended, and the capacity of the network is enlarged. Note that in this scenario the UE2 is called UE-to-Network relay and the UE1 is called remote UE.
2) UE-to-UE relay (Mode 2 shown in FIG. 1): During emergency situations (e.g., earthquake), the cellular network may operate abnormally or a sidelink communication range of the network needs to be extended. Thus, the relay communications are designed for allowing the UEs having communication with each other via the relay UE. As shown in FIG. 1, UE3 communicates with UE4 via UE5 (or multiple relay UEs (not shown in FIG. 1)), wherein UE5 is called UE-to-UE relay in this scenario.

Figure 2:
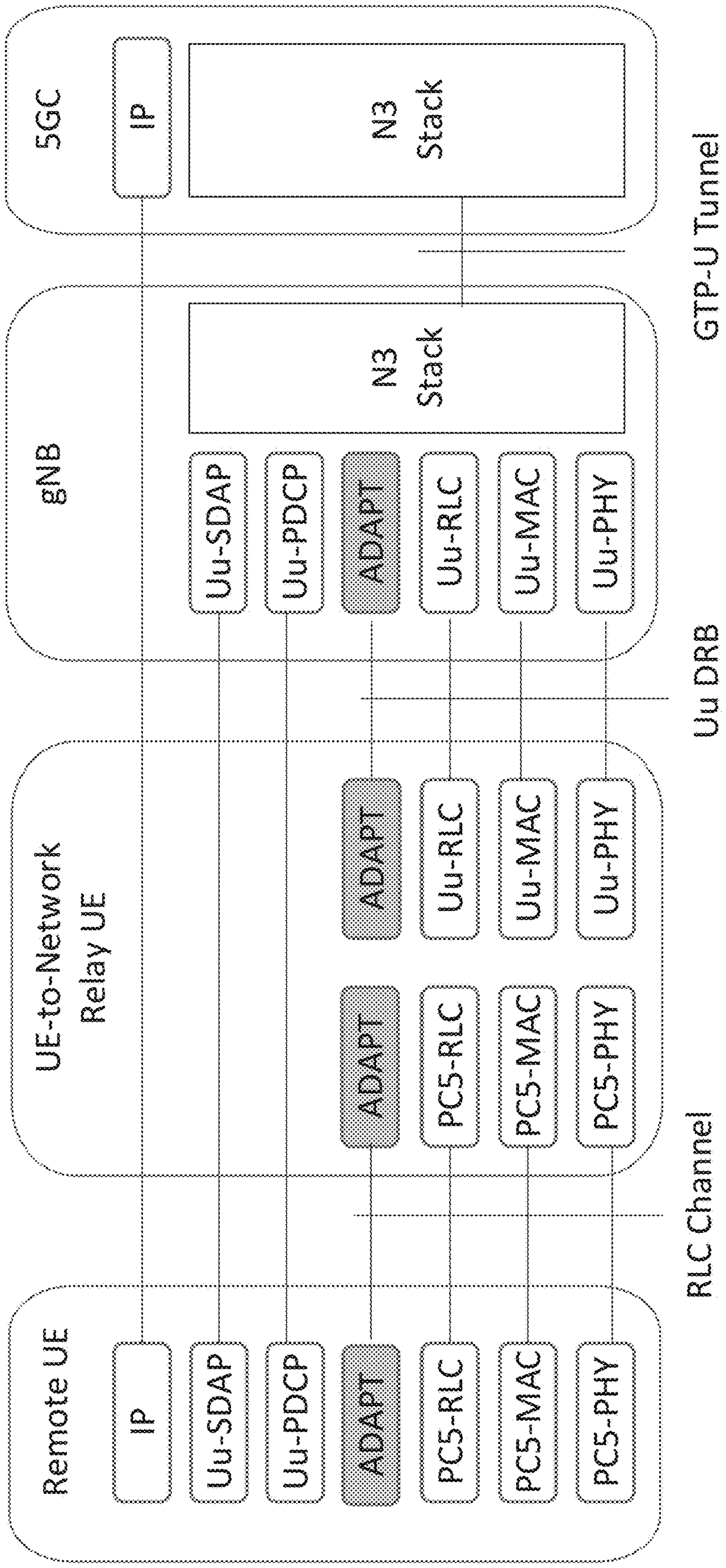
FIG. 2 shows an example user plane protocol stack for L2 UE-to-Network Relay.

For L2 UE-to-Network Relay, the adaptation layer is placed over RLC sublayer for both control plane (CP) and user plane (UP) at the Uu interface between Relay UE and gNB. In addition, the adaptation layer is played over RLC sublayer for both CP and UP at the PC5 interface between remote UE and gNB. As we know, the adaptation layer sub-header is added to the relayed traffic between remote UE and gNB. The adaptation layer may include the remote UE ID and RB ID. FIG. 2 shows the user plane (UP) protocol stack of L2 UE-to-Network relay. The Uu SDAP/PDCP and RRC are terminated between Remote UE and gNB, while RLC, MAC and PHY are terminated in each link (e.g., the link between Remote UE and UE-to-Network Relay UE and the link between UE-to-Network Relay UE and the gNB).

Sidelink control information (SCI) format 1-A including:

Priority-3 bits

Frequency resource assignment—

$$\left\lceil \log_2\left(\frac{N_{subChannel}^{SL}\left(N_{subChannel}^{SL}+1\right)}{2}\right)\right\rceil$$

bits when the value of the higher layer parameter sl-MaxNumPerReserve is configured to 2; otherwise $$\left\lceil \log_2\left(\frac{N_{subChannel}^{SL}\left(N_{subChannel}^{SL}+1\right)\left(2N_{subChannel}^{SL}+1\right)}{6}\right)\right\rceil$$

bits when the value of the higher layer parameter sl-MaxNumPerReserve is configured to 3.

Time resource assignment—5 bits when the value of the higher layer parameter sl-MaxNumPerReserve is configured to 2; otherwise 9 bits when the value of the higher layer parameter sl-MaxNumPerReserve is configured to 3.

Resource reservation period—$\lceil \log_2 N_{rsv\_period} \rceil$ bits, where $N_{rsv\_period}$ is the number of entries in the higher layer parameter sl-ResourceReservePeriodList, if higher layer parameter sl-MultiReserveResource is configured; 0 bit otherwise.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example 0

During the discussion of sidelink communication inter-UE coordination, one technical solution is proposed to transmit the assistance information via a first-stage or a Second-stage SCI or PSFCH-like signaling. If SCI, or a first-stage, or a Second-stage SCI, or PSFCH-like signaling is used to transmit the assistance information, then techniques need to be developed to determine the priority of the signaling (e.g., signaling that includes SCI or PSFCH-like signaling) for performing intra-UE prioritization?

The procedure for inter-UE coordination can include the following operations:

Step 1: UE-B can send to the UE-A the inter-UE coordination request signaling that may carry the assistance configuration. Here, the assistance configuration may include the information used for UE-A to determine the assistance information.

Step 2: UE-A can send the response signaling carrying the assistance information. In another case, UE-A can send the response signaling carrying the assistance information without receiving the request signaling.

Therefore, this patent application describes at least four objects: request signaling carry assistance configuration, assistance configuration, response signaling carry assistance information, assistance information. The techniques described in this patent document can be configured for any one of these four objects.

1. Techniques for Performing Intra-UE Coordination, e.g., Techniques to Determine Priority of the Signaling 1.(a) For UE-A to obtain or determine the priority of signaling carrying the assistance information or of the assistance information:

The techniques described below can be used to (1) set the priority for the signaling, or (2) set the priority for the assistance information. For (2), the priority of signaling carrying the assistance information can be same as the priority of the assistance information.

A. A gNB may configure priority for the signaling that carries or includes the assistance information or for the assistance information. For example, the gNB may transmit to the UE-A a priority of the signaling that carries or includes the assistance information. In some embodiments, the priority can be allocated via SIB or RRC signaling or MAC CE or physical signaling or pre-configuration.

B. UE-B may provide or transmit a specific priority for the signaling that carries or includes the assistance information or for the assistance information to UE-A.

In some embodiments, UE-B can provide the priority via RRC signaling or MAC CE or physical signaling.

In some embodiments, the specific priority is the highest data priority in UE-B when UE-B sends the request signaling.

C. The priority of the signaling carrying the assistance information or for the assistance information is the priority of signaling (e.g., request message) sent by UE-B to UE-A that trigger UE-A to provide the assistance information.

1.(b) For UE-B to determine priority of signaling carry assistance configuration:

A. gNB may configure priority for the signaling that carries or includes the assistance configuration or for the assistance configuration. For example, the gNB may transmit to the UE-B a priority of the signaling that carries or includes the assistance configuration. In some embodiments, the priority can be allocated via SIB or RRC signaling or MAC CE or physical signaling or pre-configuration.

B. The priority of the signaling that carries or includes the assistance configuration or for assistance configuration is the highest priority in UE-B.

In some embodiments, if a specific channel is designed or configured to carry the assistance information (for example, PSFCH-like channel), UE (e.g., UE-A) can be configured with a resource pool with or without the specific channel resource. In some other embodiments, if UE (e.g., UE-B) want to trigger peer UE (e.g., UE-A) to provide the assistance information, UE (e.g., UE-B) should select the resource pool configured with the specific channel resource. In another embodiment, the UE-B can indicate to the UE-A the specific resource (e.g., a list of one or more frequencies and/or a list of one or more time values) so that UE-A may transmit the assistance information using a frequency resource and/or a time resource from the list(s) indicated by the UE-B.

For SL-DRX design, since UE-B knows when to receives the assistance information, if SL-DRX is configured, UE-B should be in active time. The time when UE-B intend to receive the assistance information is UE-B's active time.

2. Techniques for Indicating Parameters for UE to Obtains the Transmission Resource for the Signaling that Carries the Assistance Information or Signaling that Carries Assistance Configuration (e.g., in Mode1 or Mode2)

Any one or more of the following parameters can be indicated to the UE (e.g., UE-A) by the gNB or the other-UE:

A priority configured for the signaling or for assistance information or for assistance configuration;

A hybrid automatic repeat request (HARQ) retransmission number configured for the signaling or for assistance information or for assistance configuration, which HARQ retransmission number indicates a number of times HARQ retransmission is allowed for retransmitting the signaling or assistance information;

A packet delay budget (PDB) configured for the signaling or for assistance information or for assistance configuration;

A packet error ratio (PER) configured for the signaling or for assistance information or for assistance configuration; and/or HARQ enable/disable attribute is configure for the signaling or for assistance information or for assistance configuration.

In some embodiments, if the signaling or assistance information or assistance configuration is HARQ enabled, UE (e.g., UE-B) should select a resource pool configured with PSFCH resource if UE (e.g., UE-A) want to transmit the signaling or assistance information or assistance configuration using one or more resources from the resource pool.

In some embodiments, UE-B should send the indication to gNB to indicate that UE-B wants to receive the assistance information via a specific resource, so that gNB can configured a resource pool with the specific resource to UE-B. Such indication can be transmitted via RRC or MAC CE or PHY signaling.

In some embodiments, a scheduling request (SR) resource if configured for the signaling or assistance information or assistance configuration.

In another embodiment, any attribute described above of the signaling carrying assistance information is same as the assistance information. In another embodiment, any attribute described above of the signaling carrying assistance configuration is same as the assistance configuration. For example, the priority is configured for the assistance information, then priority of SCI carrying assistance information is the priority of assistance information.

In some embodiments, During LCP, UE select the destination to transmit data if corresponding destination has the signaling carrying assistance information to transmit.

In some embodiments, the resource pool is configured with an attribute that whether this resource pool is allowed to transmit the signaling carrying assistance information or assistance configuration.

In some embodiments, above configuration can be configured via RRC singling, SIB, MAC CE, or physical signaling, PC5 RRC signaling, or peer UE.

Example 1

In this example, we discuss how relay UE and remote UE considers the local identifier (ID) is valid. In SL relay, the local ID is allocated by remote UE or relay UE or gNB to identify the remote UE in gNB or relay UE. However, the local ID is not always valid.

If one of following conditions is met, remote UE considers the local ID is not valid or remote UE cannot use the local ID or remote UE should drop the stored local ID:

- Remote UE switch from indirect link to direct link.
- Physical cell id or cell id of selected relay UE has been changed.
- Physical cell id or cell id of connected relay UE has been changed.
- The specific timer expiry If one of following conditions is met, remote UE considers the local ID is valid or remote UE can use the local ID:

- Physical cell ID or cell ID of selected relay UE has not been changed.
- Physical cell ID or cell ID of connected relay UE has not been changed.

The specific timer is started by the remote UE if any one of the following condition is met:

- Upon going to RRC_IDLE
- Upon going to RRC_INACTIVE
- Upon Uu RLF of relay UE is detected.
- Upon PC5 RLC is detected.
- Upon triggering the relay (re-)selection.

The specific timer is stopped by the remote UE if any one of the following condition is met:

- The cell id or physical cell id of selected relay UE has been changed.
- Remote UE switch from indirect link to direct link.
- Upon going to RRC_CONNECTED.
- Upon receiving the RRCSetup message.
- Upon receiving the RRCResume message.
- Upon receiving the RRCRestablishment message.
- Upon transmitting the RRCSetupRequest or RRCSetupComplete message.
- Upon transmitting the RRCResumeRequest or RRCResumeComplete message.
- Upon transmitting the RRCRestablishmentRequest or RRCReestablishmentComplete message.

When the remote UE identifies that the specific timer expires:

- The local ID is not valid, or
- UE cannot encapsulate the local ID in adaptation layer.

Only if the local ID of remote UE is valid, remote UE can encapsulate the local ID in PC5 adaptation layer header.

Example 1A

In SL relay, there are PC5 adaptation layer header or Uu adaptation layer header, remote UE can encapsulate the local ID in PC5 adaptation layer header, or relay UE can encapsulate the local ID of remote UE in Uu adaptation layer header. In Example 1A, techniques are described for how a relay UE determines whether the it should encapsulate the local ID in adaptation layer header.

In some embodiments, a specific set of or a specific local ID is used to indicate whether relay UE need to encapsulate the local ID in adaptation layer header for remote UE's traffic. For example, the local ID is set to all zeros means relay UE needs to encapsulate the local ID in adaptation layer.

In some embodiments, an indication in PC5 adaptation layer header is included to indicate whether relay UE need to encapsulate the local ID in Uu adaption layer header.

In some embodiments, an indication in PC5 adaptation layer header is included to indicate whether the local ID in PC5 adaptation layer is empty or not valid or valid.

If relay UE recognizes that the local ID in adaptation layer is the specific or one of a specific set of local ID, relay UE encapsulate the local ID of remote UE in Uu adaptation layer header.

If the indication is included in PC5 adaptation layer header to indicate relay UE needs to encapsulate the local ID in Uu adaptation layer, relay UE encapsulate the local ID of remote UE in Uu adaptation layer header.

If the indication in PC5 adaptation layer header indicates that the local ID in PC5 adaptation layer header is empty or not valid, relay UE encapsulate the local ID of remote UE in Uu adaptation layer header.

The specific local ID can be all zero or all one.

Example 2

Considering the signaling radio bearer (SRB) and dedicated radio bearer (DRB) share the same ID space (e.g., both ID 1,2,3 can be used for SRB and DRB), this Example 2 section describes how to differentiate the SRB and DRB:

In some embodiments, a or a set of ID cannot be used for DRB or SRB of remote UE if remote UE connect with gNB via relay UE.

In some embodiments, adaptation layer header include an indication to indicate whether the corresponding data is from a SRB or DRB. In some embodiments, the adaptation layer header is over PC5 interface or Uu interface.

In some embodiments, SRB and DRB does not share the same bearer mapping configuration.

Figure 3:
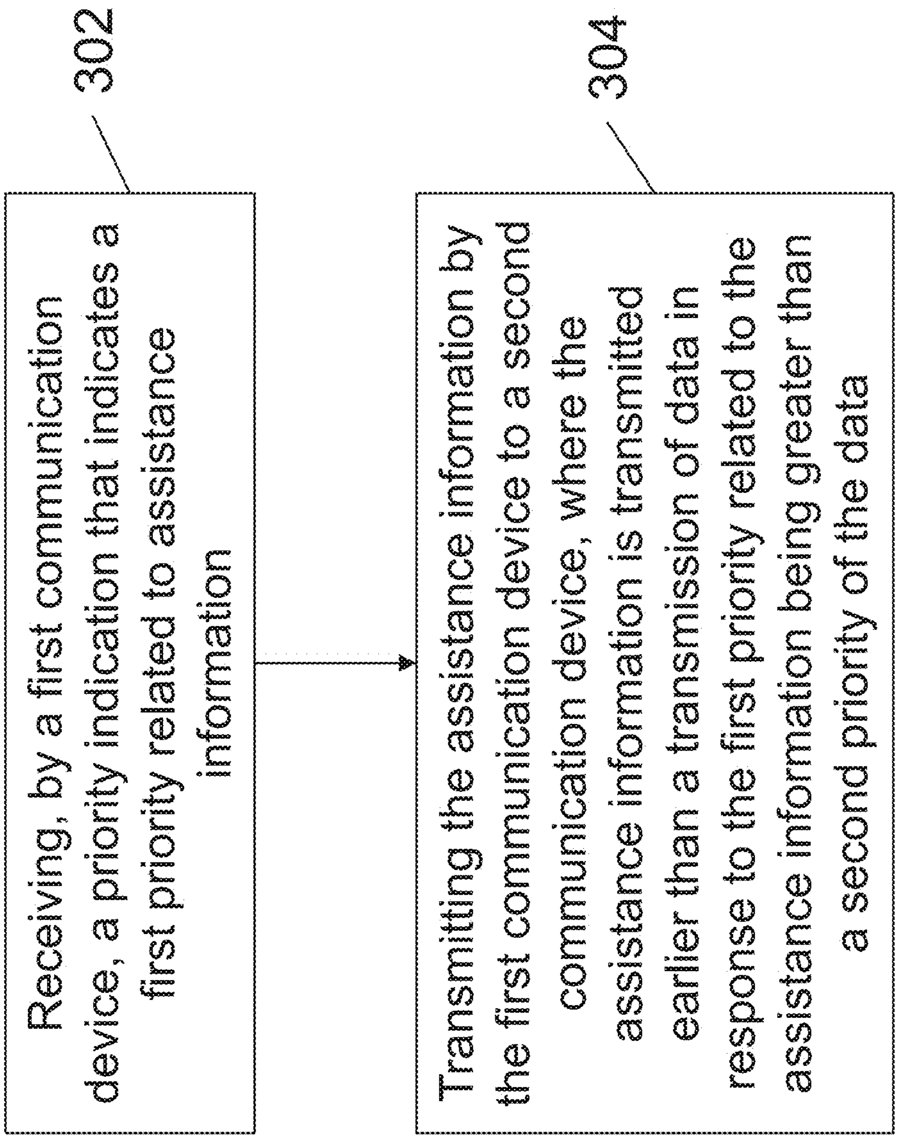
FIG. 3 shows an exemplary flowchart for transmitting assistance information.

FIG. 3 shows an exemplary flowchart for transmitting assistance information. Operation 302 includes receiving, by a first communication device, a priority indication that indicates a first priority related to assistance information. Operation 304 includes transmitting the assistance information by the first communication device to a second communication device, where the assistance information is transmitted earlier than a transmission of data in response to the first priority related to the assistance information being greater than a second priority of the data.

In some embodiments, an example wireless communication method includes receiving, by a first communication device, a priority indication that indicates a first priority related to assistance information, and transmitting the assistance information by the first communication device to a second communication device, where the assistance information is transmitted in time domain relative to a transmission of data by comparing the first priority related to the assistance information to a second priority of the data. For example, the assistance information is transmitted earlier than the transmission of the data in response to the first priority related to the assistance information being greater than a second priority of the data. In another example, the assistance information is transmitted after the transmission of the data in response to the first priority related to the assistance information being less than a second priority of the data.

In some embodiments, the first priority is a priority of a signaling that includes the assistance information. In some embodiments, the first communication device receives the priority indication from a network device. In some embodiments, the first communication device receives the priority indication from the second communication device. In some embodiments, the first priority related to the assistance information is the same as a highest data priority in the second communication device when the first communication device receives from the second communication device a request that triggers the first communication device to transmit the assistance information. In some embodiments, the first priority related to the assistance information is the same as a third priority of another signaling received by the first communication device from the second communication device, and the another signaling triggers the first communication device to transmit the assistance information.

In some embodiments, the first communication device receives from the second communication device a list of one or more frequencies and/or a list of one or more time values, and the first communication device transmits the assistance information using a frequency and/or a time value from the list of one or more frequencies and/or the list of one or more time values. In some embodiments, the first communication device includes a first user equipment (UE), and wherein the second communication device includes a second UE.

Figure 4:
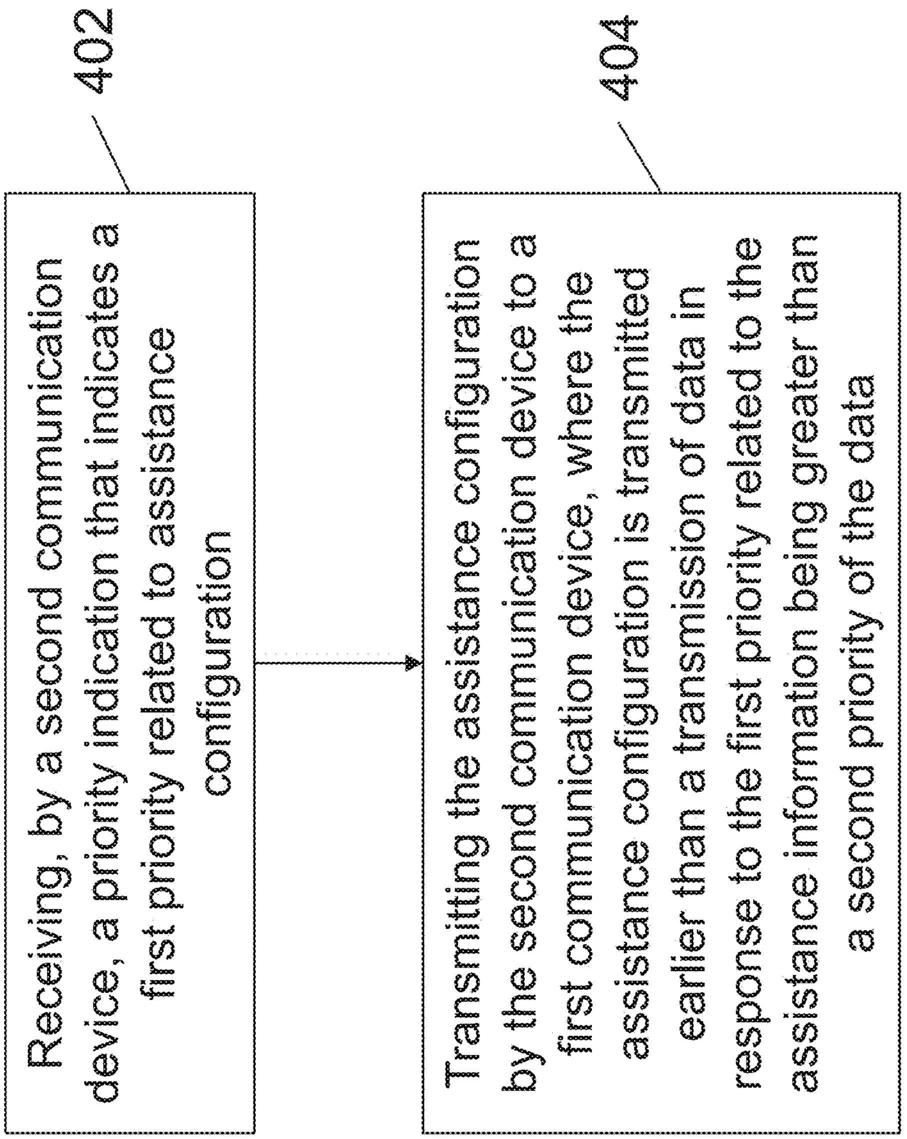
FIG. 4 shows an exemplary flowchart for transmitting assistance configuration.

FIG. 4 shows an exemplary flowchart for transmitting assistance configuration. Operation 402 includes receiving, by a second communication device, a priority indication that indicates a first priority related to assistance configuration. Operation 404 includes transmitting the assistance configuration by the second communication device to a first communication device, where the assistance configuration is transmitted earlier than a transmission of data in response to the first priority related to the assistance information being greater than a second priority of the data.

In some embodiments, an example wireless communication method includes receiving, by a second communication device, a priority indication that indicates a first priority related to assistance configuration, and transmitting the assistance configuration by the second communication device to a first communication device, where the assistance configuration is transmitted in time domain relative to a transmission of data by comparing the first priority related to the assistance configuration to a second priority of the data. For example, the assistance configuration is transmitted earlier than the transmission of the data in response to the first priority related to the assistance configuration being greater than a second priority of the data. In another example, the assistance configuration is transmitted after the transmission of the data in response to the first priority related to the assistance configuration being less than a second priority of the data.

In some embodiments, the first priority is a priority of a signaling that includes the assistance configuration. In some embodiments, the second communication device receives the priority indication from a network device. In some embodiments, the first priority related to the assistance configuration is the same as a highest data priority in the second communication device. In some embodiments, the second communication device receives any one or more: a hybrid automatic repeat request (HARQ) retransmission number that indicates a number of times HARQ retransmission is allowed for retransmitting the signaling or the assistance information; a packet delay budget (PDB) for the signaling or for the assistance information; a packet error ratio (PER) configured for the signaling or for the assistance information; and/or a HARQ enable or disable attribute for the signaling or for the assistance information. In some embodiments, the first communication device includes a first user equipment (UE), and wherein the second communication device includes a second UE.

In some embodiments, an apparatus for wireless communication comprising a processor, configured to implement method(s) described in this patent document. In some embodiments, a non-transitory computer readable program storage medium having code stored thereon, the code, when executed by a processor, causing the processor to implement method(s) described in this patent document.

Figure 5:
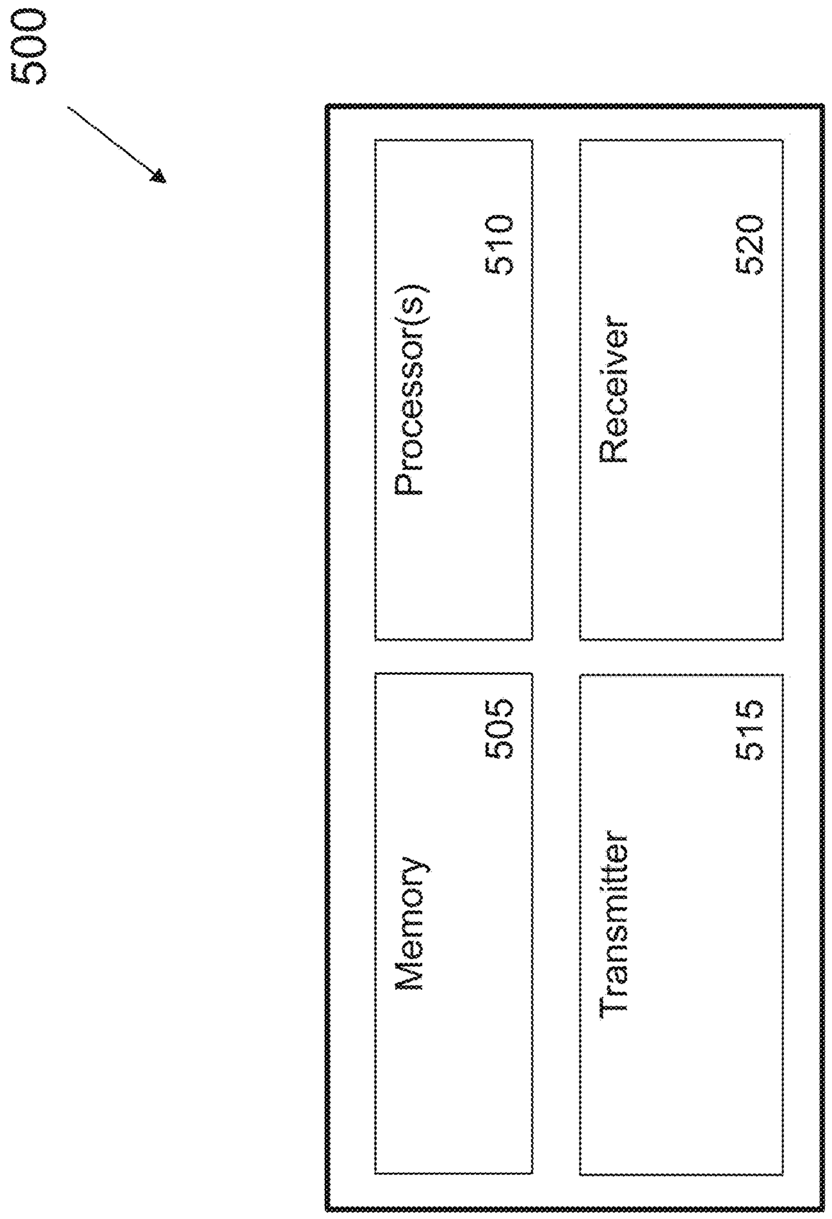
FIG. 5 shows an exemplary block diagram of a hardware platform that may be a part of a network device or a communication device.

FIG. 5 shows an exemplary block diagram of a hardware platform 500 that may be a part of a network device (e.g., base station) or a communication device (e.g., a user equipment (UE)). The hardware platform 500 includes at least one processor 510 and a memory 505 having instructions stored thereupon. The instructions upon execution by the processor 510 configure the hardware platform 500 to perform the operations described in FIGS. 1 to 4 and 6 and in the various embodiments described in this patent document. The transmitter 515 transmits or sends information or data to another device. For example, a network device transmitter can send a message to a user equipment (also known as communication device). The receiver 520 receives information or data transmitted or sent by another device. For example, a user equipment can receive a message from another user equipment.

Figure 6:
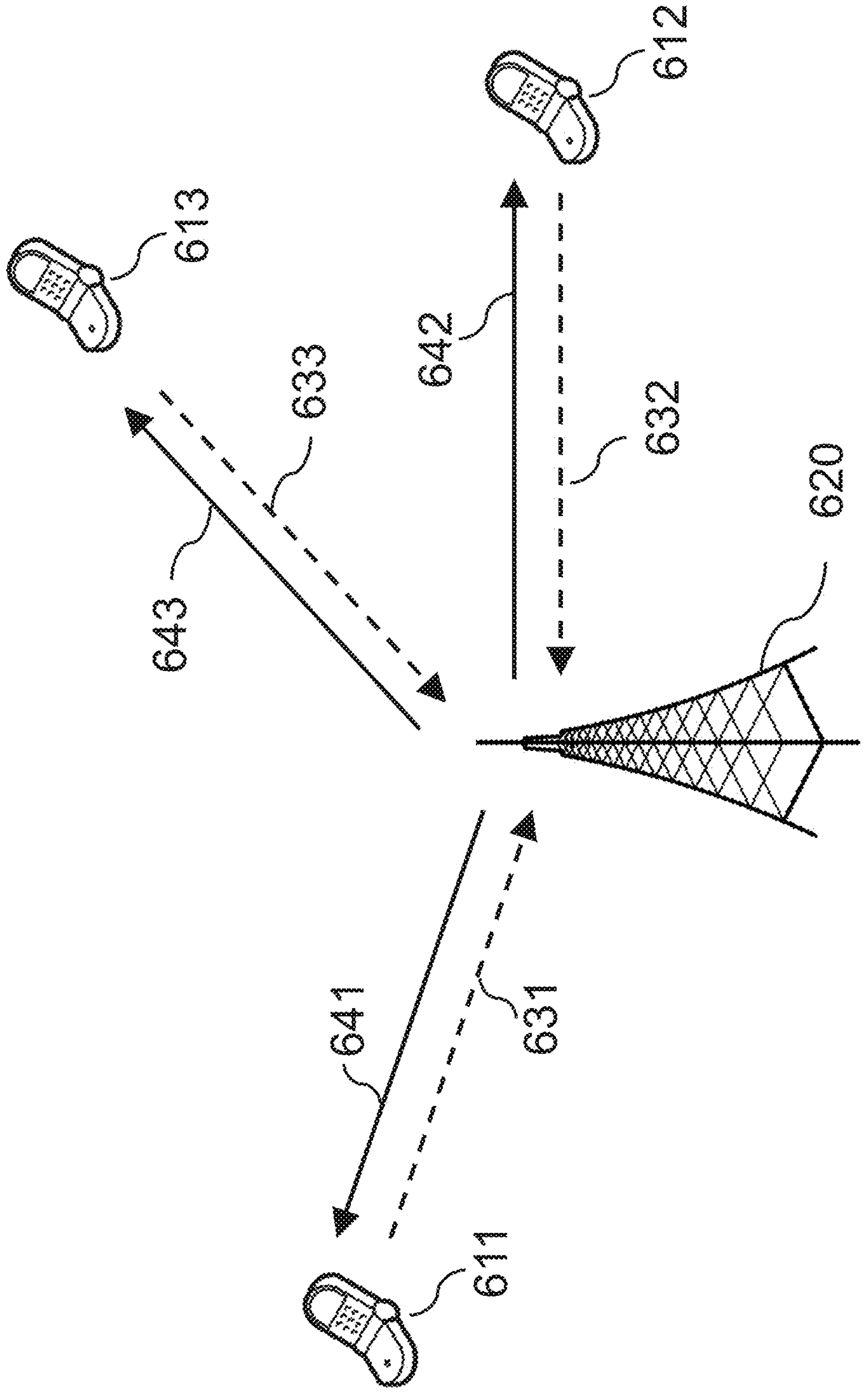
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in some embodiments by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a first communication device, a priority indication that indicates a first priority related to assistance information; and transmitting the assistance information by the first communication device to a second communication device, wherein the assistance information is transmitted earlier than a transmission of data in response to the first priority related to the assistance information being greater than a second priority of the data.

2. The method of claim 1, wherein the first priority is a priority of a signaling that includes the assistance information.

3. The method of claim 1, wherein the first communication device receives the priority indication from a network device.

4. The method of claim 1, wherein the first communication device receives the priority indication from the second communication device.

5. The method of claim 4, wherein the first priority related to the assistance information is the same as a highest data priority in the second communication device when the first communication device receives from the second communication device a request that triggers the first communication device to transmit the assistance information.

6. The method of claim 1, wherein the first priority related to the assistance information is the same as a third priority of another signaling received by the first communication device from the second communication device, and wherein the another signaling triggers the first communication device to transmit the assistance information.

7. The method of claim 1, wherein the first communication device receives from the second communication device a list of one or more frequencies and/or a list of one or more time values, and wherein the first communication device transmits the assistance information using a frequency and/or a time value from the list of one or more frequencies and/or the list of one or more time values.

8. The method of claim 1, wherein the first communication device includes a first user equipment (UE), and wherein the second communication device includes a second UE.

9. An apparatus for wireless communication comprising:

at least one processor, configured to implement a method that causes the apparatus to:

receive, by a first communication device, a priority indication that indicates a first priority related to assistance information; and transmit the assistance information by the first communication device to a second communication device, wherein the assistance information is transmitted earlier than a transmission of data in response to the first priority related to the assistance information being greater than a second priority of the data.

10. The apparatus of claim 9, wherein the first priority is a priority of a signaling that includes the assistance information.

11. The apparatus of claim 9, wherein the first communication device receives the priority indication from a network device.

12. The apparatus of claim 9, wherein the first communication device receives the priority indication from the second communication device.

13. The apparatus of claim 12, wherein the first priority related to the assistance information is the same as a highest data priority in the second communication device when the first communication device receives from the second communication device a request that triggers the first communication device to transmit the assistance information.

14. The apparatus of claim 9, wherein the first priority related to the assistance information is the same as a third priority of another signaling received by the first communication device from the second communication device, and wherein the another signaling triggers the first communication device to transmit the assistance information.

15. The apparatus of claim 9, wherein the first communication device receives from the second communication device a list of one or more frequencies and/or a list of one or more time values, and wherein the first communication device transmits the assistance information using a frequency and/or a time value from the list of one or more frequencies and/or the list of one or more time values.

16. The apparatus of claim 9, wherein the first communication device includes a first user equipment (UE), and wherein the second communication device includes a second UE.

17. A non-transitory computer readable program storage medium having code stored thereon, the code, when executed by a processor implements a method, comprising:

receiving, by a first communication device, a priority indication that indicates a first priority related to assistance information; and transmitting the assistance information by the first communication device to a second communication device, wherein the assistance information is transmitted earlier than a transmission of data in response to the first priority related to the assistance information being greater than a second priority of the data.

18. The non-transitory computer readable program storage medium of claim 17, wherein the first priority is a priority of a signaling that includes the assistance information.

19. The non-transitory computer readable program storage medium of claim 17, wherein the first communication device receives the priority indication from a network device.

20. The non-transitory computer readable program storage medium of claim 17, wherein the first communication device receives the priority indication from the second communication device.

* * * * *